June 15, 1965   R. R. BALAGUER   3,189,487
METHOD OF ASSEMBLING BATTERIES
Filed Oct. 20, 1961   2 Sheets-Sheet 1

United States Patent Office 3,189,487
Patented June 15, 1965

3,189,487
METHOD OF ASSEMBLING BATTERIES
Rodolfo Rodriguez Balaguer, Harbor Beach, Fort Lauderdale, Fla., assignor to J. D. Hedges and Company, Limited Partnership, Kingston, Jamaica, British West Indies, a limited partnership of Cuba
Filed Oct. 20, 1961, Ser. No. 146,505
19 Claims. (Cl. 136—175)

The present invention relates to a method of assembling primary batteries and like structures.

In United States Patent 2,903,499, issued September 8, 1959, to Rodolfo Rodriguez Balaguer, there is described a primary battery construction in which a cylindrical metallic anode is mounted within a carbon cathode cup so as to be concentric therewith. The present invention is concerned particularly with a method of assembling certain components in a structure of this general type, although it should be understood that the principles of the invention are applicable also to other similar structures which present similar assembly problems.

In a battery structure of the type shown in the aforementioned Balaguer patent, it has been found desirable to solder the cylindrical anode to an end cap forming the bottom closure of the battery and which also serves as the battery negative terminal. It has also been found desirable to protect the end cap from the corrosive action of the battery mix by providing the inner surface of the end cap with a coating of a mastic bituminous material such as an asphalt of the type commonly used to form the top of a lead acid storage battery. Considerable difficulty has been encountered in providing a satisfactory soldered connection and in providing a satisfactory protective coating, especially in view of the importance of keeping the protective coating out of contact with the bibulous paper wrapping or other bibulous coating which covers most of the anode surface.

A principal object of the invention has been the provision of a novel and improved assembly method which overcomes these and other problems and which lends itself readily to the mass production techniques required for economical primary battery manufacture.

Another object of the invention has been the provision of a novel and improved soldering method which is especially adapted for assembling a cylindrical metal anode to a metal end cap.

A further object of the invention has been the provision of such a method which affords good electrical and mechanical joinder even in the case of a magnesium anode.

Still another object of the invention has been the provision of such a method in which the protective coating on the end cap inner surface is achieved without contact of the coating material with the bibulous paper wrapping of the anode cylinder.

Another problem which has been encountered in the battery assembly has been the insertion of the cylindrical anode into the battery mix contained in the carbon cathode cup. A feature of the invention has been the provision of a method by which such insertion is facilitated.

Another feature of the invention has been the provision of a novel and improved bibulous paper blank which facilitates battery assembly.

Other and further objects, features and advantages of the invention will appear more fully from the following description of the invention taken in connection with the appended drawings, in which.

Figure 1:
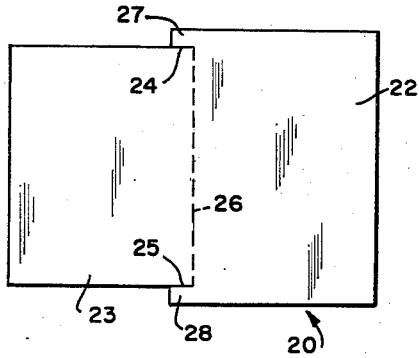
FIG. 1 is a plan view of a bibulous coating blank in accordance with the invention.

Referring now to the drawings, and more particularly to FIGS. 1–4, reference numeral 20 designates generally a bibulous paper blank, while reference numeral 21 designates a sheet metal anode element which might be zinc, magnesium, aluminum or other readily corroded anode metal. In FIG. 1 the unfolded paper blank is shown as comprising a rectangular portion 22 having a smaller rectangular portion 23 projecting from one side thereof.

The upper and lower edges of the portion 23 are parallel to but disposed slightly inwardly of the upper and lower edges, respectively, of the portion 22. The portion 22 is cut along a line 24 which extends inwardly from and parallel to the upper edge of the portion 23. The portion 22 is also cut along a line 25 which extends inwardly from and parallel to the lower edge of portion 23. The cut lines 24 and 25 terminate at an imaginary fold line 26 and thus provide tabs 27 and 28 at the upper and lower edges, respectively, of the portion 22. The fold line 26 forms the center line of the blank 20.

Figure 2:
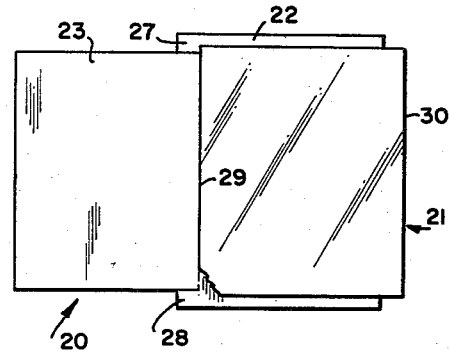
FIG. 2 is a plan view similar to FIG. 1 showing an anode blank positioned on the paper blank.

The anode 21 is shown as a flat metal blank in FIG. 2 and is positioned on the blank 20 so that the upper and lower edges of the anode are parallel to the upper and lower edges of the portion 22 and are located between the upper edges of the portions 22 and 23 and between the lower edges of the portions 22 and 23, respectively. Front edge 29 of anode 21 overlies fold line 26. Rear edge 30 of anode 21 extends beyond the outer side edge of portion 22.

Figure 3:
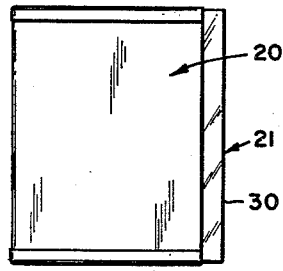
FIG. 3 is a plan view showing the paper blank folded onto the anode blank.

As shown in FIG. 3, the blank 20 is folded along the fold line 26 so that that part of blank 20 to the left of fold line 26 (in FIG. 1) overlies a first surface of the anode 21, while that part of blank 20 to the right of fold line 26 (in FIG. 1) overlies the second surface of anode 21. A portion of anode 21 adjacent edge 30 thereof is free of the paper wrapping. That part of blank 20 lying above the upper edge of anode 21 is folded forwardly and downwardly so as to overlie the first surface of the anode 21 and its paper covering, while that part of blank 20 lying below the lower edge of anode 21 is folded forwardly and upwardly so as to overlie the first surface of the anode 21 and its paper covering. The free ends of tabs 27 and 28 are then folded rearwardly so as to overlie the second surface of anode 21 and its paper covering.

The folded upper and lower edges of the blank 20 and the folded tabs 27 and 28 may be affixed adhesively to the paper surfaces which they overlie, as by a starch paste or other suitable adhesive material.

Figure 4:
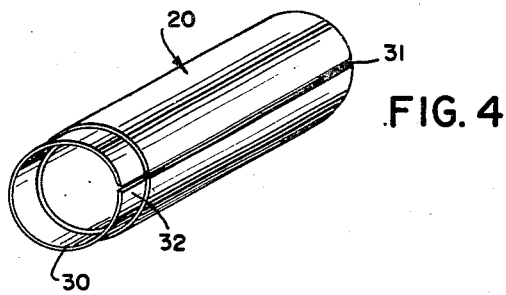
FIG. 4 is a perspective view showing the anode of FIGS. 2 and 3 rolled and with the bibulous paper wrapping thereon.

The anode with its paper wrapping is rolled into a cylindrical shape, as shown in FIG. 4, with the first anode surface (visible in FIGS. 2 and 3) and its paper covering forming the inside cylinder surface, and the second anode surface (the reverse of the sides visible in FIGS. 2 and 3) and its paper covering forming the outside cylinder surface.

The upper and lower edges (FIGS. 2 and 3) of the anode sheet may touch or they may be spaced slightly as shown in FIG. 4 by the gap 31 and which results from the natural springiness of the metal. In FIG. 4, that portion of the anode which lies between edge 30 and the adjacent end of paper wrapping 20 is designated 32.

Use of the blank 20 and assembly thereof to a flat anode blank, as described, provides certain advantages, particularly the advantage that the paper will lie closely against the metal surface at all points and the advantage that no free paper edge exists along the anode edge 29.

If desired, the anode may be rolled into cylindrical shape prior to application of the bibulous paper, in which case the bibulous paper may be applied in any convenient manner, for example, as described in the aforementioned Balaguer patent. Instead of the bibulous paper, other types of bibulous coating may be applied, as, for example, the bibulous coating described in United States Patent 2,893,899, issued July 7, 1959, to Rodolfo Rodriguez Balaguer.

Figure 5:
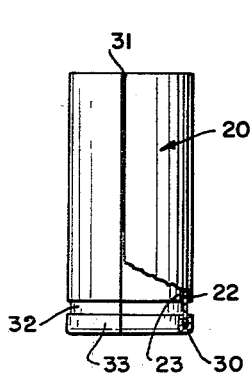
FIG. 5 is a side elevational view showing the cylindrical anode with an end collar affixed thereto.

As will be described presently, the end 30 of the anode cylinder is soldered to an end cap, the latter usually being made of a tinned soft steel. In the case of a zinc anode, the soldering may be effected directly. However, in the case of some other metals, notably magnesium, it has been found desirable to attach an annular collar to the end of the anode cylinder. As shown in FIG. 5, the collar 33 may be generally U-shaped in cross section and is placed over the edge 30 of the anode cylinder and extends to a point below the adjacent end of the bibulous paper wrapping. The collar 33 may be applied to the anode blank before or after the anode blank is formed into its cylindrical shape, except that if the collar is continuous it must be applied after the anode blank is formed into its cylindrical shape. The collar may be formed from any metal which can conveniently be soldered to the end cap, and generally will be a tinned soft steel. The collar preferably will be spot welded to the anode at a number of points to provide a good electrical contact and a good mechanical bond therebetween. The collar may be a U-shaped strip of tinned steel applied to the end of the flat anode blank and rolled into cylindrical shape when the anode is rolled. In this case the strip is preferably spot welded to the blank at one point before rolling and at three or more additional points after rolling.

Figure 6:
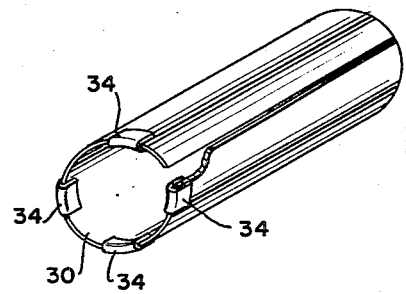
FIG. 6 is a perspective view of a cylindrical anode showing a modified form of end collar construction.
Figure 7:
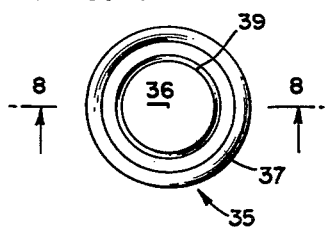
FIG. 7 is a top plan view of a battery end cap.

Instead of using a single extended collar as in FIG. 5, a number of individual collar segments may be welded to the end of the anode blank, as shown at 34 in FIG. 6. The segments 34 are preferably evenly spaced around the periphery of the end 30 of the anode blank.

As mentioned previously, the cylindrical anode is to be soldered to an end cap which serves the dual function of closing the open end of the battery cathode cup and forming the battery negative terminal. An end cap, which might be made of tinned soft steel, is shown at 35 in FIGS. 7-10.

The end cap 35 has a flat circular bottom portion 36 and an annular edge portion 37 having a downwardly and inwardly rolled outer edge 38. The outer edge 38 may be crimped over the end of a plastic or paper tube forming an outer cover for the battery. An annular groove 39 is provided at the outer edge of bottom portion 36. The diameter of groove 39 is the same as the diameter of cylindrical anode 21 and in the assembly the end 32 of the anode rests in the groove 39. For this purpose, the width of groove 39 may be slightly greater than the thickness of the anode blank or of the anode end collar or collar segments where such are provided. A sloping annular ring 39' joins the outer edge of groove 39 and edge portion 37.

Figure 8:
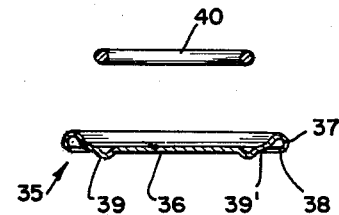
FIG. 8 is an exploded sectional view showing the end cap viewed along the line 8—8 of FIG. 7 with a solder ring positioned above the end cap.

Before assembly of the anode cylinder and the end cap, an annular ring of rosin core solder is placed over groove 39, as shown at 40 in FIG. 8. The diameter of ring 40 is the same as the diameter of groove 39. Solder and flux could be added separately if desired.

Figure 9:
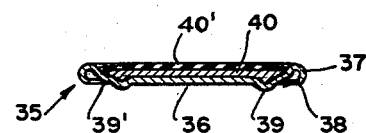
FIG. 9 is a sectional view similar to FIG. 8 showing the solder ring in contact with the end cap.
Figure 10:
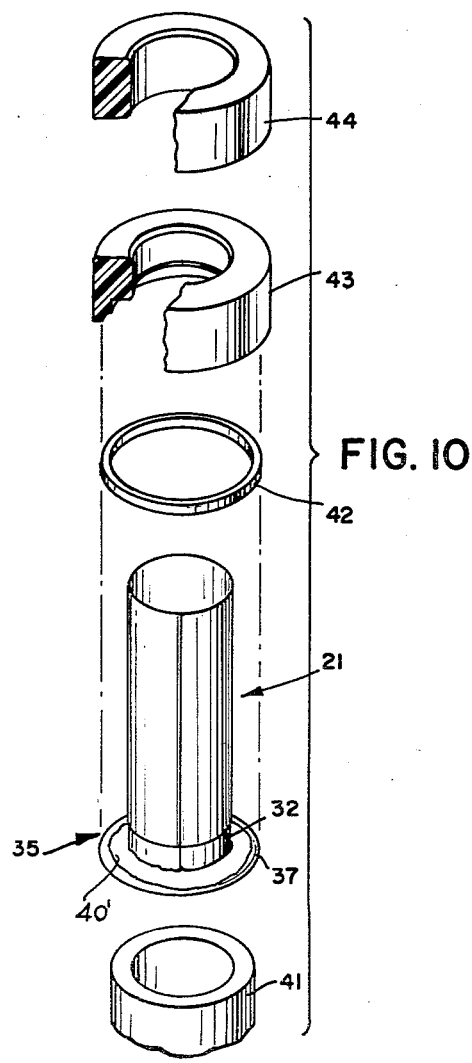
FIG. 10 is an exploded perspective view illustrating the soldering method of the invention.

The anode-end cap assembly operation is illustrated in FIGS. 9 and 10. The end cap 35 is placed on a heating element 41 which preferably has a shape conforming to the bottom of the end cap. The heating element may be electrically heated and might be similar to a soldering iron. Induction heating may be used if desired. The solder ring 40 may be inserted in the groove 39 before or after the end cap is placed on the heating element.

A washer 42 made of paper, cardboard or other suitable material may be placed on the end cap before or after the end cap is put on the heating element. The diameter of the washer corresponds to the outer diameter of the end cap so that the washer rests on the upper surface of annular edge portion 37.

The end cap 35 is heated by the heating element 41 to a temperature at which the solder ring melts. The molten solder fills the groove 39 and forms a thin layer of solder over the bottom portion 36 of the end cap.

A small quantity of molten corrosive-resistant material is then deposited on top of the layer of molten solder. The layer of molten solder is shown at 40 and the layer of corrosive-resistant material at 40' in FIG. 9. This corrosive-resistant material protects the end cap from the corrosive action of the battery mix. A suitable material is the asphalt commonly used as the top closure of lead acid storage batteries. However, other materials may be used and these may be characterized as mastic bituminous materials, although it is not essential that a hydrocarbon material be used. The corrosive-resistant material is preferably one which remains relatively soft at ambient temperatures and hence will not tend to crack in service as would a harder material such as moist pitches.

The temperature of the corrosive-resistant material need be no higher than necessary to cause the material to flow readily and provide a complete layer covering the molten solder. The quantity of the corrosive-resistant material is not critical. However, enough of this material should be supplied to cover completely that portion of the end cap which comes in contact with the battery mix, i.e., the bottom 36, the groove 39 and the annular ring 39'. If the anode is provided with a collar or collar segments, as in FIGS. 5 and 6, preferably sufficient of the material is provided to cover the collar or collar segments, or at least the weld areas. The quantity of material should not be sufficient to reach the end of the bibulous wrapping or coating.

After the asphalt or other liquid layer is formed over the molten solder, the anode cylinder is inserted with the end 32 (or the collar or collar segments, if provided) aligned with groove 39. The end of the anode cylinder penetrates the asphalt and solder layers and contacts the metal of the end cap in the area of groove 39. The heat is then turned off, or the end cap and anode cylinder are removed from the heating element. The anode and end cap are allowed to cool so that the solder and asphalt will harden. The result is a good electrical connection between the anode cylinder and the end cap and also a good mechanical bond therebetween. All portions of the end cap inwardly of the outer ring 37, except that part of the end cap in contact with the anode cylinder or collar, have an asphalt or other protective coating. The coating also extends upwardly a slight distance along the anode cylinder. It has been found that the asphalt does not prevent a good electrical contact between the anode and end cap.

It is desirable that the groove or slot 31 be eliminated when the anode cylinder is brought into contact with the end cap. After joinder of the end cap and anode cylinder, the mating edges of the anode cylinder will be held substantially together as a result of their being locked together at the point of joinder with the end cap.

Any convenient means may be used to hold the anode cylinder with the slot 31 eliminated while the soldering step is performed. For example, annular guide rings 43 and 44 may be axially spaced along the anode cylinder, as shown in FIG. 10.

No great pressure is required to be exerted on the anode cylinder to force the end thereof through the asphalt and solder layers. For example, the rings 43 and 44 may be seized manually and used to effect the necessary penetration.

The molten asphalt layer contacts the washer 42 and serves as an adhesive to hold the washer in place until the anode-end cap assembly is finally installed in the battery cathode cup. If desired, the washer may be added as a later step, but convenience is afforded by using the asphalt as an adhesive.

The entire assembly operation described may be performed manually, but it will be evident that the steps are readily susceptible of performance in an automated or semiautomated manner.

For the final battery assembly, the battery cathode cup is filled with the battery mix (electrolyte and depolarizer) to the desired level and the free end of the anode cylinder is forced into the cup through the open end of the cup and into the mix. Generally, the height of the battery mix will require substantially the entire length of anode bearing the bibulous wrapping to pass through battery mix. In accordance with a further aspect of the invention, this insertion is facilitated and the tendency for the battery mix to be forced away from the anode and out of contact with the bibulous wrapping is avoided. Thus, the bibulous paper wrapping is covered with a jellied soft starch solution shortly before insertion of the anode into the battery mix. This action effectively provides a lubricant on the bibulous paper surface. The jellied starch coating also provides for a better contact between the battery mix and the paper because the jelly acts somewhat as a spring to distribute the contact over the entire paper area.

The coating of the bibulous paper with the jellied starch solution occurs after the paper is wrapped on the anode. The coating may be effected by any suitable means which will give a good coating on both the inside and outside of the cylinder. The coating need not be thick but care should be taken that it be complete.

In the case of a zinc anode, it is desirable that the starch solution be in electrolyte. In the case of a magnesium or aluminum anode, it is desirable that the starch solution be in water, although electrolyte may be used.

As one example of a starch solution for coating the bibulous paper wrapping on a zinc anode, one-half gram of wheat starch and one-half gram of wheat flour may be dissolved in 8 cc. of an electrolyte whose composition (by weight) is 25% ammonium chloride, 15% zinc chloride, and 60% water. As an example of a starch solution for wetting the bibulous paper wrapping on a magnesium anode, one-half gram of wheat starch and one-half gram of wheat flour are dissolved in 8 cc. of water. In each case the starch solution is baked or otherwise heated so as to have a jelly-like consistency which will make the paper slippery but not wet. The jelly is then coated on the bibulous paper wrapping of the anode.

While the invention has been described in connection with specific embodiments thereof and in specific uses, various modifications thereof will occur to those skilled in the art without departing from the spirit and scope of the invention as set forth in the appended claims.

What is claimed is:

1. In the method of assembling a primary battery having a cylindrical hollow metal anode and a circular metal end cap, the steps of placing a quantity of solder on the inside surface of said end cap, heating said end cap to melt said solder whereby said solder spreads in a molten layer over at least a major portion of the inside surface of said end cap, placing a quantity of a molten mastic bituminous material on said solder layer whereby said material spreads in a molten layer over said solder layer, forcing one end of said cylindrical anode through said layers of material and solder and into firm contact with said end cap, and allowing said end cap and said layers to cool whereby said solder and said material harden.

2. In the method of assembling a primary battery having a cylindrical hollow metal anode and a metal end cap, said end cap having an annular groove with a diameter substantially equal to the diameter of said anode, the steps of forming a layer of molten solder on the inside surface of said end cap, said molten solder filling said groove, placing a quantity of a molten mastic bituminous material on said solder layer whereby said material spreads in a molten layer over said solder layer, forcing one end of said cylindrical anode through said layers of material and solder and into firm contact with the walls of said groove, and allowing said end cap and said layers to cool whereby said solder and said material harden.

3. In the method of assembling a primary battery having a cylindrical hollow metal anode and a circular metal end cap, said end cap having an outer annular ring and an annular concentric groove located radially inwardly of said outer ring, said groove having a diameter substantially equal to the diameter of said anode, the steps of providing a layer of molten solder on the inside surface of said end cap inwardly of said outer ring, said layer of solder filling said groove, placing a quantity of molten corrosive-resistant material on said solder layer whereby said material forms a layer overlying said solder layer, aligning said anode and said end cap and forcing one end of said anode through said layers of material and solder and into contact with the walls of said groove, and allowing said end cap and said layers to cool whereby said solder hardens to form a mechanical and electrical bond between said anode and said end cap and said material hardens to form a protective coating preventing contact between said end cap and battery mix upon complete assembly of said battery.

4. In the method of assembling a primary battery having a cylindrical hollow metal anode and a circular metal end cap, said end cap having an outer annular ring and an annular concentric groove located radially inwardly of said outer ring, said groove having a diameter substantially equal to the diameter of said anode, the steps of forming said anode from a metal blank, providing said anode with a bibulous covering over the inside and outside surfaces thereof except adjacent one end of said anode, placing a quantity of solder on the inside surface of said end cap, heating said end cap to melt said solder whereby said solder fills said groove and spreads in a molten layer over the inside surface of said end cap inwardly of said outer ring, placing a quantity of molten corrosive-resistant material on said solder layer whereby said material forms a layer overlying said solder layer, aligning said anode and said end cap and forcing said one end of said anode through said layers of material and solder and into contact with the walls of said groove, preventing contact between said material and said bibulous covering during said last mentioned step, and allowing said end cap and said layers to cool whereby said solder hardens to form a mechanical and electrical bond between said anode and said end cap and said material hardens to form a protective coating preventing contact between said end cap and battery mix upon complete assembly of said battery.

5. The method set forth in claim 4 in which said corrosive-resistant material is a mastic bituminous material.

6. The method set forth in claim 4 in which said corrosive-resistant material is asphalt.

7. In the method of assembling a primary battery having a cylindrical hollow metal anode and a circular metal end cap, said end cap having an outer annular ring and an annular concentric groove located radially inwardly of said outer ring, said groove having a diameter substantially equal to the diameter of said anode, the steps of wrapping a flat metal anode blank with a bibulous paper covering both surfaces of said blank except for a narrow strip adjacent one end of said blank, forming said anode from said wrapped metal blank, placing a ring of solder in said groove, heating said end cap to melt said solder whereby said solder fills said groove and spreads in a molten layer over the inside surface of said end cap inwardly of said outer ring, placing a quantity of molten corrosive-resistant material on said solder layer whereby said material forms a layer overlying said solder layer, aligning said anode and said end cap and forcing said one end of said anode through said layers of material and solder and into contact with the walls of said groove, preventing contact between said material and said bibulous covering during said last mentioned step, and allowing said end cap and said layers to cool whereby said solder hardens to form a mechanical and electrical bond between said anode and said end cap and said material hardens to form a protective coating preventing contact between said end cap and battery mix upon complete assembly of said battery.

8. In the method of assembling a primary battery having a cylindrical hollow metal anode and a circular metal end cap, said end cap being made from a different metal than said anode and having an outer annular ring and an annular concentric groove located radially inwardly of said outer ring, said groove having a diameter substantially equal to the diameter of said anode, the steps of forming said anode from a metal blank, rigidly affixing at least one collar element to one end of said anode, said collar element being made from the same metal as said end cap and affording at least a plurality of spaced like-metal surfaces for contact with said end cap, placing a quantity of solder on the inside surface of said end cap, heating said end cap to melt said solder whereby said solder fills said groove and spreads in a molten layer over the inside surface of said end cap inwardly of said outer ring, placing a quantity of molten corrosive-resistant material on said solder layer whereby said material forms a layer overlying said solder layer, aligning said anode and said end cap and forcing said one end of said anode through said layers of material and solder whereby said collar element comes into contact with the walls of said groove, and allowing said end cap and said layers to cool whereby said solder hardens to form a mechanical and electrical bond between said anode and said end cap and said material hardens to form a protective coating preventing contact between said end cap and battery mix upon complete assembly of said battery.

9. In the method of assembling a primary battery having a cylindrical hollow magnesium anode and a circular tinned steel end cap, said end cap having an outer annular ring and an annular concentric groove located radially inwardly of said outer ring, said groove having a diameter substantially equal to the diameter of said anode, the steps of forming said anode from a metal blank, rigidly affixing an annular tinned steel collar to one end of said anode, placing a quantity of solder on the inside surface of said end cap, heating said end cap to melt said solder whereby said solder fills said groove and spreads in a molten layer over the inside surface of said end cap inwardly of said outer ring, placing a quantity of molten corrosive-resistant material on said solder layer whereby said material forms a layer overlying said solder layer, aligning said anode and said end cap and forcing said one end of said anode through said layers of material and solder whereby said collar comes into contact with the walls of said groove, and allowing said end cap and said layers to cool whereby said solder hardens to form a mechanical and electrical bond between said anode and said end cap and said material hardens to form a protective coating preventing contact between said end cap and battery mix upon complete assembly of said battery.

10. In the method of assembling a primary battery having a cylindrical hollow magnesium anode and a circular tinned steel end cap, said end cap having an outer annular ring and an annular concentric groove located radially inwardly of said outer ring, said groove having a diameter substantially equal to the diameter of said anode, the steps of forming said anode from a metal blank, welding an annular tinned steel collar to one end of said anode, providing said anode with a bibulous paper covering over the inside and outside surfaces thereof except adjacent said one end of said anode, placing a ring of solder in said groove, heating said end cap to melt said solder whereby said solder fills said groove and spreads in a molten layer over the inside surface of said end cap inwardly of said outer ring, placing a quantity of molten mastic bituminous material on said solder layer whereby said material forms a layer overlying said solder layer, aligning said anode and said end cap and forcing said one end of said anode through said layers of material and solder whereby said collar comes into contact with the walls of said groove, preventing contact between said material and said bibulous covering during said last mentioned step, and allowing said end cap and said layers to cool whereby said solder hardens to form a mechanical and electrical bond between said anode and said end cap and said material hardens to form a protective coating preventing contact between said end cap and battery mix upon complete assembly of said battery.

11. In the method of assembling a primary battery having a hollow cathode cup, a cylindrical hollow metal anode located within the concentric with said cup, and a circular metal end cap, said end cap having an outer annular ring and an annular concentric groove located radially inwardly of said outer ring, said groove having a diameter substantially equal to the diameter of said anode, the steps of forming said anode from a metal blank, providing said anode with a bibulous paper wrapping covering the inside and outside surfaces thereof except adjacent one end of said anode, forming a molten solder layer over the inside surface of said end cap inwardly of said outer ring, said molten solder filling said groove, placing a quantity of molten corrosive-resistant material on said molten solder layer whereby said material forms a layer overlying said solder layer, aligning said anode and said end cap and forcing said one end of said anode through said layers of material and solder and into contact with the walls of said groove, preventing contact between said material and said bibulous paper wrapping during said last mentioned step, allowing said end cap and said layers to cool whereby said solder hardens to form a mechanical and electrical bond between said anode and said end cap and said material hardens to form a protective coating preventing contact between said end cap and battery mix upon complete assembly of said battery, coating said bibulous paper with a jellied soft starch solution, placing a predetermined quantity of battery mix in said cup, and forcing said anode with said coated bibulous paper wrapping through said battery mix into position within and concentric with said cup, said last mentioned step occurring after attachment of said end cap to said anode.

12. The method of soldering a magnesium sheet to a plate, comprising the steps of rigidly attaching a solderable collar to one end of said sheet, covering one surface of said plate with a layer of molten solder, covering said layer of molten solder with a molten layer of mastic bituminous material, aligning said sheet and said plate with said collared end of said sheet facing said covered surface, forcing said collared end of said sheet through said layers and into contact with said surface of said plate, and allowing said plate to cool and said layers of solder and material to harden whereby said solder forms a mechanical and electrical bond between said sheet and said plate and said material forms a protective coating overlying said hardened solder.

13. The method of soldering a hollow magnesium sheet to a steel plate, comprising the steps of rigidly attaching a steel collar to one end of said sheet, covering one surface of said plate with a layer of molten solder, covering said layer of molten solder with a molten layer of mastic bituminous material, aligning said sheet and said plate with said collared end of said sheet facing said covered surface, forcing said collared end of said sheet through said layers and into contact with said surface of said plate, and allowing said plate to cool and said layers of solder and material to harden whereby said solder forms a mechanical and electrical bond between said sheet and said plate and said material forms a protective coating overlying said hardened solder.

14. The method of soldering a hollow magnesium cylinder to a tinned soft steel plate having a circular groove with a diameter susbtantially equal to the diameter of said cylinder, comprising the steps of rigidly attaching an annular tinned soft steel collar to one end of said cylinder, filling said groove and covering one surface of said plate with a layer of molten solder, covering said layer of molten solder with a molten layer of mastic bituminous material, aligning said cylinder and said plate with said collared end of said cylinder facing said covered surface, forcing said collared end of said cylinder through said layers and into contact with the walls of said groove, and allowing said plate to cool and said layers of solder and material to harden whereby said solder forms a mechanical and electrical bond between said cylinder and said plate and said material forms a protective coating overlying said hardened solder.

15. In the method of assembling a primary battery having a hollow cathode cup and a hollow cylindrical anode with a bibulous paper wrapping covering the major portion of the inner and outer surfaces of said anode, the steps comprising coating said bibulous paper with a jellied soft startch solution, placing a predetermined quantity of battery mix in said cup, and forcing said anode with said coated bibulous paper wrapping through said battery mix into position within and concentric with said cup.

16. The method set forth in claim 15 in which said anode is made of zinc and in which said starch is dissolved in an electrolyte solution and then heated to a jelly-like consistency.

17. The method set forth in claim 15 in which said anode is made of magnesium and in which said solution is aqueous, said solution being heated to have a jelly-like consistency.

18. In the method of assembling a primary battery having a hollow cathode cup and a sheet metal anode with a bibulous paper wrapping covering the major portion of the surface of said anode, the steps comprising coating said bibulous paper with a jellied soft starch solution, placing a predetermined quantity of battery mix in said cup, and forcing said anode with said coated bibulous paper wrapping through said battery mix into position within said cup.

19. In the method of assembling a primary battery having a cylindrical hollow metal anode, the steps of placing a flat rectangular metal battery anode blank on a bibulous paper blank, said paper blank comprising a first rectangular portion having a height slightly greater than the height of said anode blank, and a second rectangular portion having a height slightly less than the height of said anode blank and a width less than the width of said first portion, said portions being in alignment side by side and about a central lateral axis and having a combined width less than twice the width of said anode blank, said first portion being slit below the top and bottom edges thereof, said slits being in alignment with and forming extensions of the upper and lower edges, respectively, of said second portion and extending inwardly to an imaginary fold line at the lateral midpoint of said combined portions, one side edge of said anode blank being aligned with said fold line and said anode blank being aligned with said portions about said central lateral axis, folding said paper blank about said fold line so that said blank overlies the major portion of both sides of said anode blank, folding the excess height sections of said first portion forwardly and inwardly so as to cover the top and bottom sections of said anode blank not covered by said second portion, and folding the tabs formed in said first portion by said slits about said fold line so as to overlie said first portion adjacent the upper and lower edges, respectively, of said anode blank.

References Cited by the Examiner
UNITED STATES PATENTS

| | | | |
|---|---|---|---|
| 1,331,762 | 2/20 | Hazelett | 136—131 |
| 1,808,410 | 6/31 | Heise et al. | 136—131 |
| 2,262,734 | 11/41 | Hileman | 136—175 |
| 2,903,499 | 9/59 | Balaguer | 136—107 |
| 2,940,169 | 6/60 | Barnes | 29—500 X |
| 2,987,813 | 6/61 | Pope et al. | 29—471.1 |
| 3,040,117 | 6/62 | Jammet | 136—175 |

WINSTON A. DOUGLAS, *Primary Examiner.*

JOHN R. SPECK, JOHN H. MACK, *Examiners.*

UNITED STATES PATENT OFFICE
CERTIFICATE OF CORRECTION

Patent No. 3,189,487

June 15, 1965

Rodolfo Rodriguez Balaguer

It is hereby certified that error appears in the above numbered patent requiring correction and that the said Letters Patent should read as corrected below.

In the grant, lines 2 and 3, and in the heading to the printed specification, lines 4 and 5, name of assignee, for "J. D. Hedges and Company, Limited Partnership", each occurrence read -- J. D. Hedges and Company Limited Partnership --; column 8, line 27, for "the" read -- and --; column 9, line 33, for "startch" read -- starch --.

Signed and sealed this 16th day of November 1965.

(SEAL)
Attest:

ERNEST W. SWIDER
Attesting Officer

EDWARD J. BRENNER
Commissioner of Patents